L. LE PONTOIS.
MAGNETIC SPEED INDICATOR.
APPLICATION FILED JUNE 15, 1907.

1,028,488.

Patented June 4, 1912.
2 SHEETS—SHEET 1.

L. LE PONTOIS.
MAGNETIC SPEED INDICATOR.
APPLICATION FILED JUNE 15, 1907.
1,028,488.
Patented June 4, 1912.
2 SHEETS—SHEET 2.
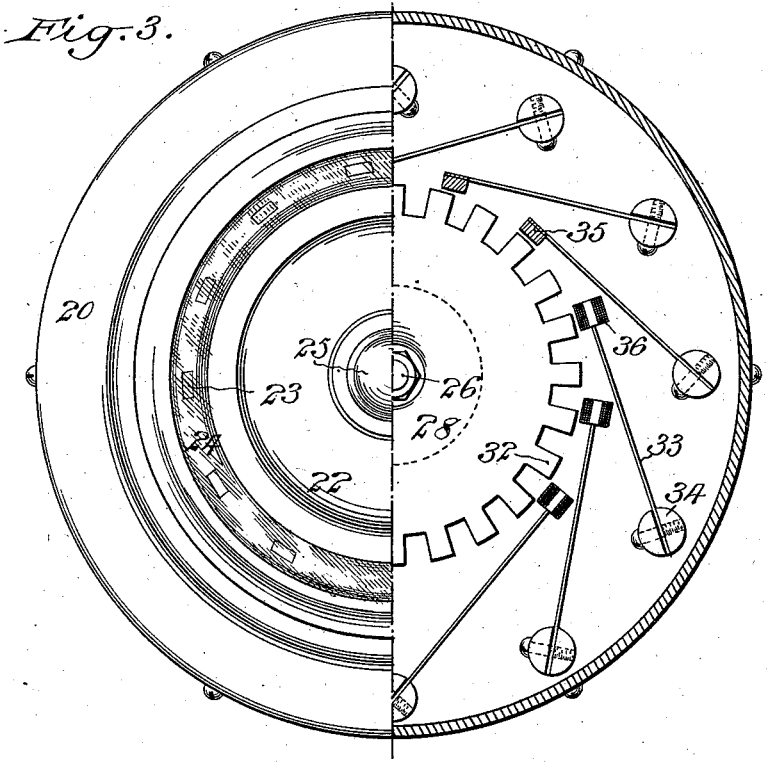
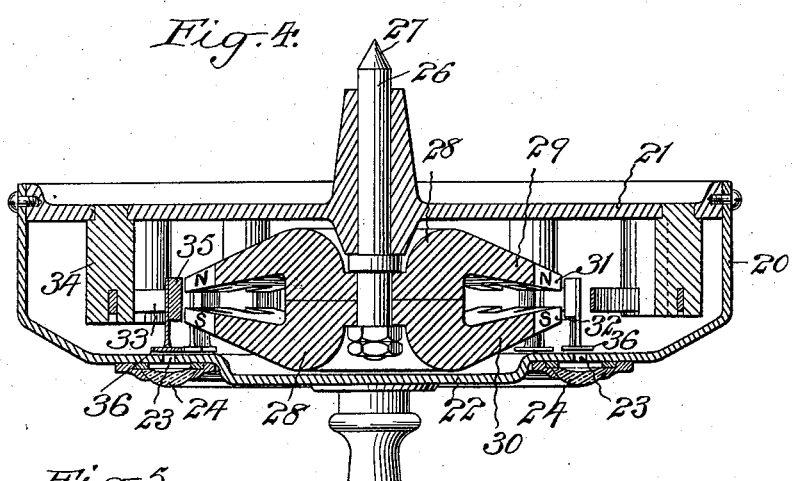

UNITED STATES PATENT OFFICE.

LEON LE PONTOIS, OF NEW ROCHELLE, NEW YORK, ASSIGNOR TO A. R. MOSLER & CO., OF NEW YORK, N. Y., A CORPORATION OF NEW YORK.

MAGNETIC SPEED-INDICATOR.

1,028,488.  Specification of Letters Patent.  Patented June 4, 1912.

Application filed June 15, 1907. Serial No. 379,131.

*To all whom it may concern:*

Be it known that I, LEON LE PONTOIS, a citizen of the United States, and resident of New Rochelle, in the county of Westchester and State of New York, have invented a new and useful Improvement in Magnetic Speed-Indicators, of which the following is a specification.

This invention relates to improvements in speed indicators and consists broadly in a magnetic speed indicator having means for producing mechanical vibration in a series of elements and means for visually indicating the vibrations of the element whose vibrations are amplified to a predetermined degree by resonance.

This invention includes a specially designed indicator having a series of metallic elements such as reeds, which are set in vibration by impulses of a magnetic nature resulting from the approach and recession of a magnet or other magnetic body, the variations in number of the approach and recession movements being themselves proportional to the speed of a rotating shaft which it is desired to indicate.

In this invention, the metallic elements, such as reeds, are caused to enter into vibration under the action of impulses of a magnetic nature, the number of impulses occurring during a given time being made to depend upon the number of revolutions accomplished by the rotary shaft during the same period of time. Means are also provided for rendering visible to the eye, the vibratory motion of the elements when sufficiently amplified by the resonance effect resulting from coincidence between the number of vibratory impulses imparted to the elements, the number of vibrations corresponding to the natural period of vibration of such elements determined by the length, stiffness and moment of inertia of said elements.

Practical embodiments of my invention are represented in the accompanying drawings, in which—

Figure 1:
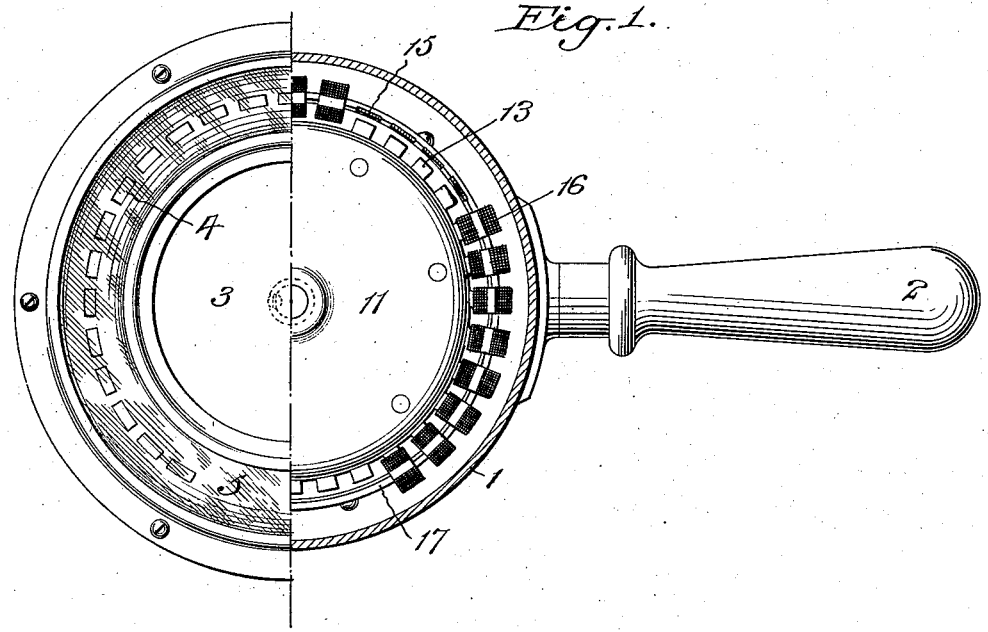
Figure 2:
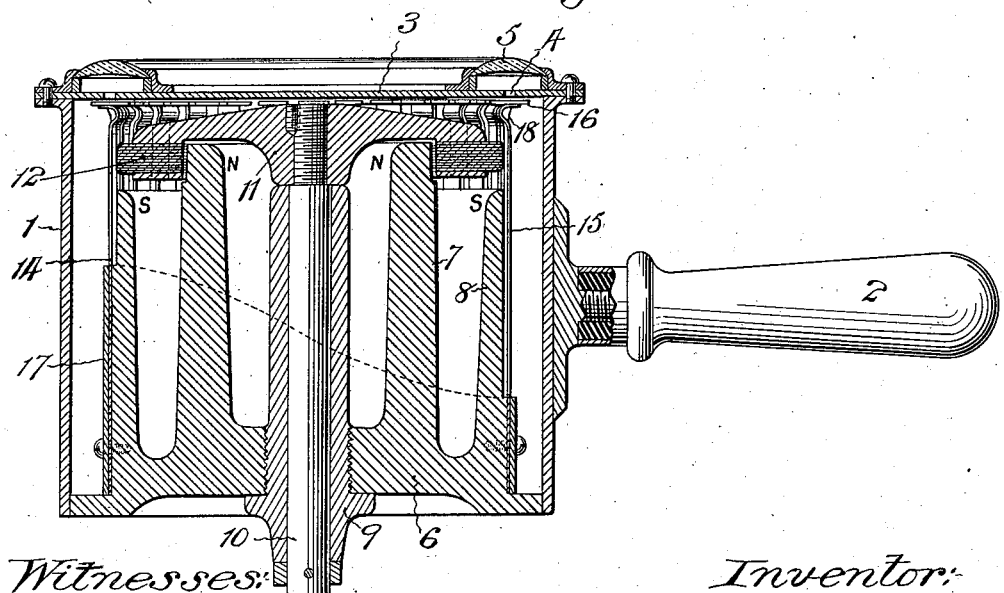

Figure 1 represents partially in top plan and partially in section a magnetic speed indicator of one form, Fig. 2 is a longitudinal central section through the same, Fig. 3 is a partial top plan and partial section of another form of magnetic speed indicator, Fig. 4 is a longitudinal central section through same, and Fig. 5 is a detail view of one of the vibratory elements and its support.

In the form shown in Figs. 1 and 2, a cylindrical casing 1 is provided with a handle 2, the front plate 3 of which casing is provided with an annular concentric series of slots 4 for disclosing the vibratory elements therethrough. An annular magnifying lens 5 is located over these slots 4 for facilitating the reading of the indicator. A circular magnet 6 is fixed within the casing 1, said magnet being provided with an inner annular flange 7 and an outer annular flange 8. A centrally arranged sleeve 9 extends into the casing and magnet, which sleeve forms a bearing for a rotary shaft 10. This shaft carries a disk 11 within the casing, which disk has secured thereto a plurality of rings 12 having an annular series of teeth 13. A steel plate 14 is wrapped around the exterior of the magnet 6, which plate is provided with an annular series of reeds 15 of different lengths, the outer ends of which reeds are provided with faces 16 located immediately in back of the slots 4 through the front wall 3 of the casing. The undivided portion of the plate 14 is secured to the magnet 6 by a clamp ring 17. The reeds are spaced a short distance from the outer annular flange 8 of the magnet and the number of reeds correspond to the number of teeth 13, carried by the rings 12. The outer end of each reed is arranged to receive a weight 18 of some soft metal which can be readily filed to properly tune each reed to permit it to have an amplified vibration under a predetermined speed of the rotary shaft 10. The shape of the magnet is such that the magnetic field closes itself through the rotating soft iron armature and partly through the reeds, the end of the inner annular flange 7 of the magnet being the north pole and the end of the outer annular flange 8 being the south pole. The faces 16 of the reeds 15 are so arranged that unless the reeds are vibrated beyond their normal vibrations there will be no visual indications through the slots 4 of such normal vibration. However, these faces 16 are so arranged or so marked that when an amplified vibration of any one of the reeds takes place, a visual indication of such amplified vibration is provided for through its slot 4. This visual indication may be provided for by causing the face 16 to permit the disclosure of light through the slot when vibrating beyond its normal limit or by providing the face with a different color upon opposite sides of a pane which is disclosed through the slot when the reed is vibrating normally or at rest. The shaft 10 may be provided with a point 19 for the axial engagement with the end of a rotating part not shown herein such, for instance, as a shaft, the speed of which it is desired to indicate. The magnetic effect upon the reeds, due to the passing of the teeth of the armature when the shaft 10 is rotated, will cause the vibration of the reeds and will also cause the amplified vibration of a certain one or more of the reeds which will be in tune with that particular speed of rotation of the shaft.

In the form shown in Figs. 3, 4 and 5, the casing is denoted by 20, its back wall by 21, and its front wall by 22. The annular series of slots 23 in its front wall are covered by an annular magnifying lens 24. The handle for the casing is denoted by 25 and it is arranged axially and in alinement with the rotary shaft 26 which carries the point 27 for axial engagement with the rotating part, the speed of which is to be registered, which rotating part is not shown herein. This rotary shaft 26 is mounted in a suitable bearing in the back wall 21 of the casing and is fixed to rotate therewith within the casing, a permanent magnet 28. This magnet 28 has two flanges 29, 30, provided with annular series of teeth 31, 32, arranged to travel in close proximity to an annular series of vibratory metallic reeds 33 secured tangentially to the magnet by binding posts 34 projecting from the back wall 21 of the casing. These reeds are of different lengths and each of the reeds is provided with a soft metal armature 35 adjacent to the teeth of the magnet, which armatures constitute the tuning weights of the reeds. Each reed is provided with a face 36 immediately back of the slots 23 and these faces are so marked or arranged that when an amplified vibration of any one of the reeds is brought about, a visual indication of such amplified vibration is provided for through the slots 23. The part 35 is intended to be filed away the proper amount for giving the desired weight to the end of the reed and consequently tuning it to the predetermined point, while the face 36 is intended to be placed upon the part 35, after the proper weight for the latter has been arrived at, in order to indicate the vibrations of the reed when they are amplified.

What I claim is:—

1. A speed indicator including a magnet having inner and outer annular flanges, a vibratory element carried by one of the flanges, and an armature provided with an annular series of teeth located between the other one of the flanges and the vibratory element.

2. A speed indicator including a magnet having inner and outer annular flanges, an annular series of vibratory elements carried by one of the flanges, and an armature provided with an annular series of teeth located between the other one of the flanges and the vibratory elements.

3. A speed indicator including a magnet having inner and outer annular flanges, a vibratory element carried by one of the flanges, an armature provided with an annular series of teeth located between the other one of the flanges and the vibratory element, a casing having a front plate provided with a slot therein registering with the outer end of the vibratory element, and a magnifying glass carried my said casing in register with the slot and the outer end of the vibratory element and on the opposite side of the slot from the vibratory element.

4. A speed indicator including a magnet having inner and outer annular flanges, an annular series of vibratory elements carried by one of the flanges, an armature provided with an annular series of teeth located between the other one of the flanges and the vibratory elements, a casing having a front plate provided with an annular series of slots therein registering with the outer ends of the vibratory elements, and an annular magnifying glass carried by the said casing in register with the slots and the outer ends of the vibratory elements and on the opposite sides of the slots from the vibratory elements.

In testimony, that I claim the foregoing as my invention, I have signed my name in presence of two witnesses, this 13th day of June 1907.

LEON LE PONTOIS.

Witnesses:
F. GEORGE BARRY,
HENRY THIEME.

Copies of this patent may be obtained for five cents each, by addressing the "Commissioner of Patents, Washington, D. C."